Figure 1:
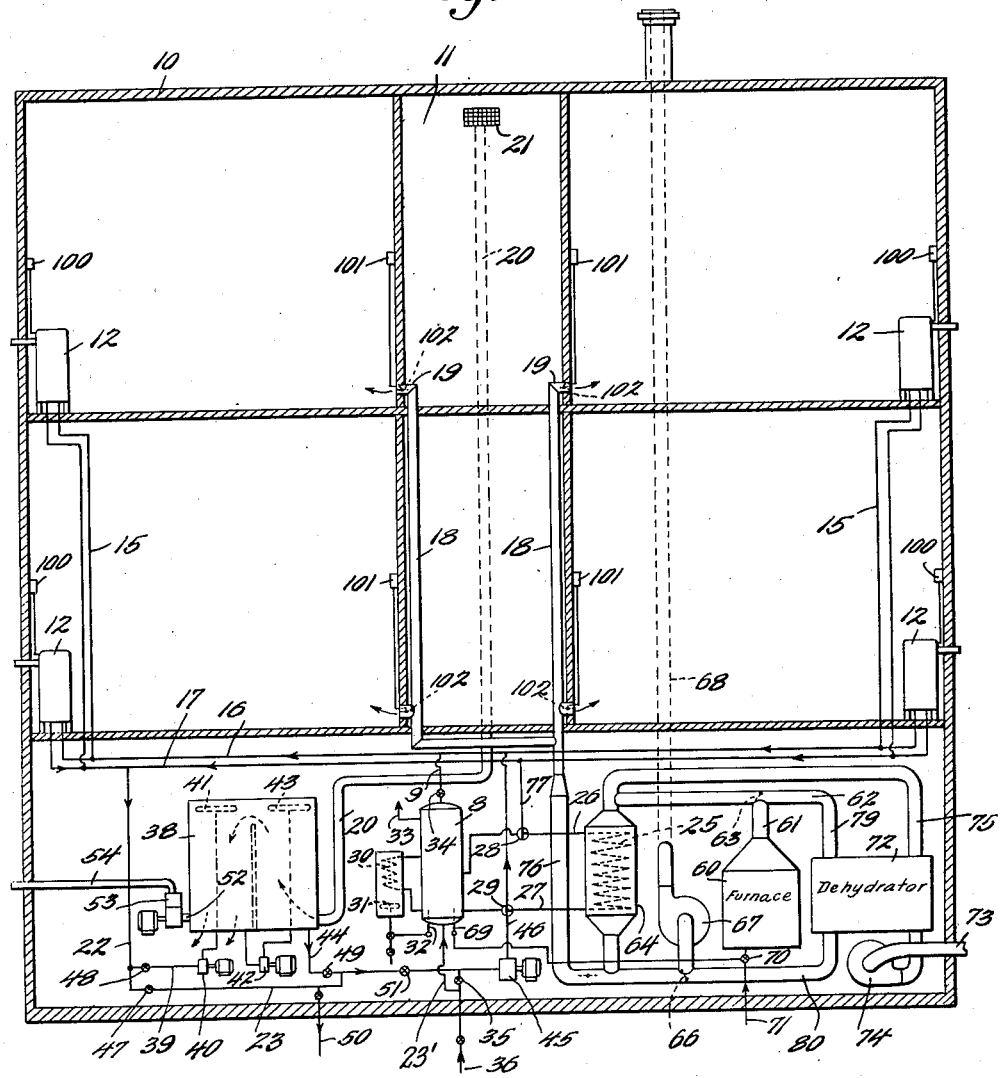

April 27, 1937. E. B. MILLER 2,078,540
AIR CONDITIONING SYSTEM
Filed Oct. 31, 1933

Inventor
E. B. Miller,
By Watson, Coit, Morse
& Grindle
Attorney

Patented Apr. 27, 1937

2,078,540

UNITED STATES PATENT OFFICE 2,078,540

AIR CONDITIONING SYSTEM

Ernest B. Miller, Annapolis Roads, Md.

Application October 31, 1933, Serial No. 696,069

17 Claims. (Cl. 257—8)

The present invention relates to air conditioning, using that term in its broadest sense, and includes a method of and apparatus for heating, cooling and regulating the humidity and circulation of air in a building.

It is a general object of the present invention to provide a novel and improved air conditioning system.

More particularly it is an object of the invention to provide a novel air conditioning system in which temperature control is effected individually in each room by a circulating medium whose temperature is regulated in accordance with the comfort requirements and in which humidity regulation is effected by delivering to each room a regulated quantity of air of a predetermined humidity and further in which circulation of air is effected both in connection with the temperature regulating medium and the humidity regulating medium.

An important feature of the invention resides in the use of radiating surfaces, at least one in each room, to which are supplied in the summer a cooling medium and in the winter a heating medium, which may be circulated in the customary pipes provided, as in an existing hot water or steam heating system, and wherein there is a positive circulation of air over the radiator under the control of a thermostat to regulate the temperature of the room; the humidity of the room, particularly when cooling is effected, being controlled by delivering a regulated quantity of air of a predetermined humidity to the room.

A further important feature of the invention resides in the use of the same furnace for supplying heat in the winter and providing the dehydration for the air in the summer.

Another important feature of the invention resides in the use of a common heat exchange surface for winter heating and for summer cooling of the dehydrated air.

Still another important feature of the invention resides in the provision of a common hot water storage tank used both for the heating system in winter and for the source of domestic hot water.

In accordance with the present invention, a system is contemplated which can be conveniently fitted into an existing building, making use of piping already existing, or which can be provided in a new building at extremely moderate cost.

Briefly the present system includes a unit for producing dry air at a convenient location in the basement which forces the same by fan pressure through the simplest possible duct system to the various spaces to be conditioned. Heating in winter and cooling in summer in the conditioned spaces is accomplished by circulating water or other suitable medium through a piping system which may be the same as customarily used in steam or hot water heating. The ordinary radiators are supplanted by cabinets, each including individual means for circulating the air in the room over a suitable heat transferring surface. The small fan for this purpose is controlled thermostatically, making it possible to independently control the temperature in any room.

The power requirements for circulating the heating or cooling water in the system plus that required for circulating the air in the individual cabinets is much less than would be required for circulating air by a complete duct system as used in existing central unit conditioning plants.

In the present system the entire capacity of the dehydration unit can be concentrated in one unit if desired, or apportioned among the various units in any ratio found necessary to meet changing conditions.

Important features and objects not specifically pointed out above will be more apparent to those skilled in the art upon a consideration of the accompanying drawing and following specification, wherein is disclosed a single exemplary embodiment of the invention, with the understanding that such changes and modifications may be made therein as fall within the scope of the appended claims without departing from the spirit of the invention.

Figure 2:
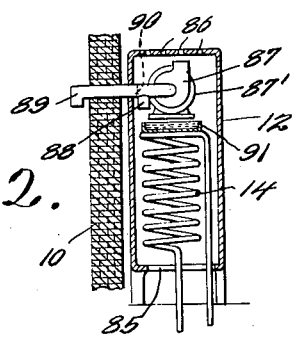

In said drawing:

Figure 1 is an elevation of a building equipped with a system according to the present invention shown diagrammatically and schematically; and Figure 2 is a sectional scheme of an individual heating and air circulating cabinet as used in each room.

Referring now to the drawing, there is depicted at 10 any building in which it is desired to condition the air. In the present showing it is a dwelling having first and second floors and a basement, with a center hall shown at 11. Each individual unit of space, as the four rooms indicated, is to be considered independently for the purposes of this invention and each may be equipped, as shown, with a cabinet 12, more completely illustrated in detail in Figure 2, and containing some suitable radiating surface 14, as for instance, a coil and fins as is common in the socalled concealed types of radiators. These coils are connected by piping 15 to the main 16 and return 17. This piping may constitute the already existing piping in an old building, such as used for a hot water heating system, a two-pipe steam or vapor system or the like, and the cabinets and their radiating surfaces may be substituted for the original radiators where the equipment is fitted to an old building.

Each room can by the circulation of a proper medium through its radiator 14 be heated or cooled, but in order to also control the relative humidity of the air in the room as well as to supply fresh air for ventilating purposes, means are provided for conducting a considerable quantity of air to each room of controlled humidity as required according to existing conditions.

For the purpose of conducting the air, the very simplest form of duct system possible is resorted to, here indicated as a pair of risers 18 in the hall each having the shortest possible connection 19 in order to deliver air into the rooms. The location of the pipe 19 for admitting the air is of no great importance, the whole idea being merely to introduce the air into the space to be conditioned in the simplest possible manner. In order to remove the air which has served its purpose in the rooms it can be withdrawn through a simple duct system, such as the single return 20 shown as having its single inlet at 21 at the highest place in the hall, which is preferable, but where existing structural features interfere with the use of such a return duct it can simply pass through the lower floor and take the used air from that point. Air will find its way from the rooms to the return inlet since no building has airtight doors and walls.

A duct system as just described can readily be placed in most existing buildings and room for it can be found in new buildings with much greater ease than for the complicated duct systems of existing air conditioning schemes where all of the conditioning is done by the circulated air which provides either the necessary heat or cooling as well as humidity regulation and which requires a carefully engineered entrance register for each room and an exactly positioned return register from that room. As compared with such a system the ducts in the present system are probably only ten per cent or less in extent.

For heating purposes hot water is circulated in the pipes 15, 16 and 17 and the radiators 14 and is supplied from the insulated storage tank 8 having a top connection 9 to the main 16 and a bottom connection 23', 23, 22 to the return 17. This tank is heated optionally from the exchange surface or coil 25, to be later described in more detail, and through the pipes 26, 27, or from the small coil 30 as in the conventional storage water heater, using a suitable burner 31 under the control of the thermostat 32 to maintain a uniform temperature of water in the storage tank which is used not only for heating the building but for supplying domestic water as through the pipe 33.

In the summertime the coil 30 provides heat for domestic water and the valves 34 and 35 are closed, cutting off the storage tank from the radiator system. For moderate days, when just a little heat is needed mornings and evenings, the valves 34 and 35 may be opened and the burner 31 used also for room heating. When the heater coil 30 is in use, the valves 28 and 29 are set to separate the exchange surface 25 from the storage tank 8.

To provide cooling for the rooms, cold water is circulated in the water piping system 15, 16, 17 and the coils 14. This water may be provided from any source, as for instance, a well, a domestic water system which enters through the pipe 36, or from a suitable water cooling system, as for instance, the water cooling tower 38 with which the present system is shown equipped. This tower 38 may be any one of the conventional and well-known water cooling towers wherein the water is sprayed through currents of air to produce evaporative cooling.

In the present scheme water from the return pipe 22 passes through the pipe 39 to the pump 40 driven by the attached motor and is lifted to the top of a compartment in the tower and sprayed down from the head 41 in a shower. From the bottom of this left hand compartment the water is collected and by the pump 42 and its motor elevated to the second spray head 43 where it is showered down and finally in its cooled state taken off through the pipe 44 which leads to the circulating pump 45 suitably motor driven to circulate the cold water, for instance, into the pipe 46 which connects to the main 16, delivering the cold water to the piping system and positively circulating it from whence it returns through the pipes 17 and 22, back to the cooling tower. In this case a valve 47 in the water return pipe 23 is shut off so as to deliver all water through the cooling tower.

When using the piping for a heating system, the valves 48 and 49 are shut off to bypass the cooling tower which is not used in the winter time.

When it is desired to use hydrant water for cooling, the valve 35 in the pipe 36 is opened, the valve 48 is closed and circulation is up through the pipe 46, distribution system, returns 17 and 22, open valve 47 and out through the drain 50. It may be advisable to provide a valve 51 to prevent direct wastage of the entering water.

An important feature of the present invention is the use of the air from the return duct 20 for evaporative cooling in the water cooling tower as shown by the arrows therein. The return duct 20 enters at the bottom of one of the compartments and from the bottom of the other compartment air is withdrawn through the pipe 52 by means of the fan 53 driven by the connected motor and is discharged through the pipe 54 to the outdoors, laden with moisture which it has picked up in the water cooler by evaporation in the actual process of reducing the temperature of the water in the tower. This air in the return duct is of a relatively low wet bulb temperature, even though it has been used in dehumidification of the building. Its wet bulb temperature is lower than that of the usual atmosphere and therefore considerable gain is had by using it. Furthermore, the power used by the fan 53 for withdrawing this air from the conditioned space is also made use of in cooling the water.

The means of producing cooling water by utilizing return air in a cooling tower, assures cooling water with a temperature that varies up and down following approximately the changes in outside atmospheric conditions. In other words, the dry bulb temperature on the inside of the house could be at all times maintained a fairly constant number of degrees lower than outside dry bulb temperatures.

For winter heating purposes heat is provided to the transfer surface 25 for heating the water in the tank 8 by means of a furnace 60 which may burn any desired type of fuel, preferably gas or oil. The furnace gases rise through the duct 61 and to the duct 62 in which they are constrained to travel to the left by a proper setting of the damper 63. They then pass down through the jacket 64 surrounding the coils 25 and by a proper setting of the damper 66 enter the exhaust fan 67 which discharges them through the flue 68 to the chimney on the roof. It is preferred to keep the water in the tank 8 at a temperature of approximately 130°, and this can be effected by a thermostat 69 in this tank which controls the valve 70 in the fuel pipe 71 to the furnace. This temperature of water is satisfactory both for heating and domestic use.

Positive water circulation is used during heating and the pump 45 delivers water directly into coil 25 by a proper setting of three-way valve 29. A proper setting of valve 28 allows all water heated in coil 25 to be delivered into tank 8 and thence by pipe 9 into the heating system.

To supply dehydrated air to the ducts 18 use is made of the dehydrator 72 which may be of any suitable form and containing a material which will adsorb moisture, such as calcium chloride, silica gel or various of the other substances known for the purpose, or may even consist in a refrigeration system which removes the moisture by lowering the temperature below the dew-point of the air. For the purposes of this application, the dehydrator has been represented as of the type using an adsorbent material.

Fresh air is drawn from the outside through duct 73 by means of the circulating fan 74, passed thence into the dehydrator 72 where a portion of the moisture is removed from it, delivered to the duct 75 which passes it through the jacket 64 surrounding the coil 25 and then by virtue of proper settings of the dampers 63 and 66 delivered into the main 76 which connects to the risers 18 previously described.

Air dehydrated by adsorption has its temperature increased due to the heat of wetting and the heat of adsorption of the adsorbent and this heat is removed by means of the surface 25 which becomes a cooling coil and has a portion of the cooling water circulated by the pump 45 delivered into pipe 27 at its valve 29 junction with the pipe 46. This water flows through the coil and by means of the pipe 26 and pipe 77 is returned to the water return header 17. The three-way valves 28 and 29 are of course now set to isolate the tank 8 from the coil 25 and the pipes 46 and 77.

When the dehydrator is used, portions of the adsorbent material must be at times treated to remove the moisture and condition it for further use, and preferably a continuous type of dehydrator, having a rotor bringing fresh adsorbent into the line of the air to be dehydrated and carrying the used adsorbent into position to be treated by hot gases for the removal of the moisture, is used. Under these conditions the same furnace 60 which in the winter time supplies heat for heating the building provides the necessary hot gases for activating the adsorbent material. The damper 63 is set as shown in the drawing and the hot combustion gases or heated air delivered through the duct 79 to that portion of the dehydrator requiring them, from whence they are withdrawn through the duct 80 by means of the suction fan 67 with the damper 66 set as shown, and hence discharged through the stack to the atmosphere.

In Figure 2 the radiator cabinets, which may be of standard construction, are shown more in detail to illustrate their method of operation. Preferably the casings are supported sufficiently free of the floor to permit ingress of air at 85 and are perforated at the top to permit exit thereof as at 86. Each cabinet is provided with a positive circulating means such as the fan 87 driven by motor 87' and normally drawing air from above the coil 14 through the fan inlet 88, so that when heating or cooling is to take place the operation of the fan draws air from down near the floor up over the coil 14. Here the air changes its temperature in accordance with the medium in the coil and is positively delivered into the room, thus affording continuous positive circulation of air of the type required to condition the room as regards temperature, the conditioning relative to humidity being effected through the air delivered from the duct openings 19.

There are a number of days during the year when it is neither desirable to heat nor cool the air but adequate circulation is essential for ventilation, and at times fresh air from outdoors may be desirable when, for instance, the duct system is not in operation. Each cabinet provides for this by having an auxiliary intake 89 for each fan 87 which by the operation of a damper 90 can be set to withdraw air from outdoors and circulate it into the room, thus permitting the windows to remain closed throughout the season and yet have conditioning of the air in the building as desired. Each cabinet is fitted with air filtering means so that both recirculated and fresh air are cleaned. Windows need never to be opened, so that external noise and dust are excluded.

While not shown in the drawing, a simple form of humidifier can be supplied in the duct system for use in the winter time, if desired, but preferably each radiator cabinet is equipped with a convenient and conventional form of humidifying equipment which permits water from a pan 91 to be evaporated by the heat of the radiator coils at a rate in accordance with the temperature thereof.

Individual control of the temperature in the rooms is effected by a room thermostat 100, one of which is provided for each room, which is connected to start and stop the motor of the fan 87 in the cabinet. In the winter time the thermostats will be set to turn on the fan when the temperature becomes too low in the room and in the summertime when the temperature becomes too high in the room. The type of radiation used in this cabinet is such that under natural draft conditions it would not be at all sufficient for its intended purpose, so that if the fan is not running there is but little heating in the winter or cooling in the summer, but with the fan in operation the radiators become effective for their desired purpose. This permits the simple thermostat control.

For summertime humidity control a humidistat 101 may be provided in each room controlling a damper 102 in the air inlet duct 19 to that room so that if the air in the room becomes too dry, dehydrated air delivered to that room is shut off and vice versa.

The power requirements for the system just described are considerably less than in connection with present central unit systems, since the quantity of air circulated is much less. In winter no main air circulation is effected by the ducts 18 and only those circulating fans in the cabinets where heating is required need be operated. In the summertime the same is true, for cooling will not often be required in all rooms at the same time. The total power when all sources of circulation are in use in the present system is much less than in the central unit types.

The system is extremely flexible and it is not essential that all rooms be equipped with the cabinets containing radiators and air circulating means. The remaining rooms can use ordinary radiators and cabinets can be substituted later if desired.

It will be obvious that the system can be equipped with any form of automatic controls as might be essential, for instance, to effect automatically the shift from summer to winter conditions in accordance with outside temperature, to operate one or the other of the heating means for the hot water tank in accordance with the rate of demand, and to start and stop the dehydration apparatus in accordance with the wet bulb temperature or the relative humidity of the outside air, the inside air or any combination of these conditions. For the purpose of simplifying this specification, practically all the automatic controls have been left off except those for the cabinet fans and dampers in the rooms and the two thermostats for maintaining a constant temperature in the hot water tank.

Having thus described the invention, what is claimed as new and desired to be secured by Letters Patent is:

1. An air conditioning system including in combination, a radiator for each room, means associated therewith to positively circulate the room air thereover, means to circulate a medium through the radiators, means to heat said medium when required, means to cool said medium when required, independent means to supply a quantity of air of predetermined humidity to each room, means to withdraw air from the rooms during cooling and means to use said withdrawn air alone to cool said circulating medium to the desired extent.

2. In an air conditioning system, in combination, a cabinet in each room to be conditioned and including a radiator, a humidifier and means to positively circulate the room air over the radiator; means to supply a heated or a cooled medium to the radiator, means to supply dried air to each room independently of the cabinet and means to individually control the amount of dried air supplied to each room.

3. In an air conditioning system, in combination, a radiator for each room, a fan to positively circulate air from the room over said radiator, a thermostat in control of said fan to place it in operation only when the room temperature requires changing, means to supply a heated or cooled medium to the radiator in accordance with the season, means to supply to each room air of a sufficiently low humidity to give the desired condition in the room and a humidistat to control the quantity of such air delivered to each room.

4. In an air conditioning system, in combination, a radiator for each room, means to circulate cold water in said radiator, means independent of the radiator system to supply air to each room of a humidity considerably lower than that of the room air, means to withdraw air from the rooms and means to contact the withdrawn air and returned water to thereby alone cool the water by evaporation sufficiently for reuse.

5. In an air conditioning system, in combination, a piping system for circulating cold water for directly cooling rooms, a simple duct system leading to the rooms, means to dehydrate air by absorption and deliver it to the duct system to regulate the humidity of the cooled rooms, an exhaust duct adapted to take air from said rooms, and means to intimately contact the exhaust air and return water to thereby alone cool the water sufficiently for reuse.

6. In an air conditioning system, in combination, a piping system for circulating cold water for directly cooling rooms, a simple duct system, means to dehydrate air and deliver it to the duct system to regulate the humidity of the cooled spaces, an exhaust duct, means to intimately contact the exhaust air and return water to cool the water for reuse, and means to circulate a portion of the cooled water to remove the heat of dehydration from the air before delivery to the ducts.

7. In an air conditioning system, in combination, a radiator and piping system, a delivery and return duct system, an air dehydrator, a furnace to supply heat to revivify the material in the dehydrator, a connection between the delivery duct system and dehydrator, a heat transfer surface therein, means to intimately contact water returned from the radiator system and air from the duct system to cool the water for reuse and means to deliver a part of the cooled water to said heat transfer surface to remove the heat of dehydration from the air.

8. In an air conditioning system, in combination, a radiator and piping system, a delivery and return duct system, an air dehydrator, a furnace to supply heat to revivify the material in the dehydrator, a connection between the delivery duct system and dehydrator, a heat transfer surface therein, means to intimately contact water returned from the radiator system and air from the duct system to cool the water for reuse, means to deliver a part of the cooled water to said heat transfer surface to remove the heat of dehydration from the air, a storage tank for hot water, means to circulate water therefrom in the radiator system for heating and means to then deliver gases from the furnace over said heat transfer surface to heat water for said tank.

9. In an air conditioning system, in combination, a radiator and piping system, a delivery and return duct system, an air dehydrator, a furnace to supply heat to revivify the material in the dehydrator, a connection between the delivery duct system and dehydrator, a heat transfer surface therein, means to intimately contact water returned from the radiator system and air from the duct system to cool the water for reuse, means to deliver a part of the cooled water to said heat transfer surface to remove the heat of dehydration from the air, a storage tank for hot water, means to circulate water therefrom in the radiator system for heating, means to then deliver gases from the furnace over said heat transfer surface to heat water for said tank, and means to maintain a constant temperature in said tank.

10. Apparatus for conditioning air for buildings including in combination, a radiator and piping system, means to circulate water in said system, means to heat said water comprising a storage tank, a heat exchange device connected thereto and a furnace to supply a heating medium to said device, means to deliver air to the building, a dehydrator for said air, means to use heat from the furnace to revivify the dehydrator, means to optionally cool said water and means to then pass a portion of said water into said heat exchange device and said air over said device to cool the same.

11. Apparatus for conditioning air for buildings including in combination, a radiator and piping system, means to circulate water in said system, means to heat said water comprising a storage tank, a heat exchange device connected thereto and a furnace to supply a heating medium to said device, means to deliver air to the building, a dehydrator for said air, means to use heat from the furnace to revivify the dehydrator, means to optionally cool said water, means to then pass a portion of said water into said heat exchange device and said air over said device to cool the same, means to then isolate said tank from the piping system and auxiliary means to supply heat to the tank for domestic water.

12. In an air conditioning system, in combination, means to directly heat the air present in a room, means to alternatively directly cool the air present in the room, means to dehydrate outside air by adsorption, means to deliver the dehydrated air to the room, means to remove used air from the room, a furnace adapted to activate the adsorption means when cooling is used and to supply the heat for direct heating when used and means to effect the direct cooling by use of the removed air.

13. In an air conditioning system, in combination, means to directly heat the air present in a room, means to alternatively directly cool the air present in the room, means to dehydrate outside air by adsorption, means to deliver the dehydrated air to the room, means to remove used air from the room, a furnace adapted to activate the adsorption means when cooling is used and to supply the heat for direct heating when used, means to effect the direct cooling by use of the removed air, and means to circulate the air in each room to control the rate of heating or cooling.

14. An air conditioning system including, in combination, a central dehydration plant, a radiator for each room to be conditioned, means to circulate a medium through the radiators, means to heat said medium when required, means to cool said medium when required, means to supply a quantity of air of substantially fixed humidity from said plant to each room, and means to control the humidity in each room independently of the other rooms.

15. An air conditioning system including, in combination, a radiator for each room, individual means to positively circulate room air over each radiator, means to circulate a medium through the radiator, means to heat said medium when required, means to cool said medium when required, means to supply to each room a quantity of air of substantially fixed humidity, said quantity being regulated separately for each room, and means to regulate the temperature of each room by controlling the air circulation over its radiator.

16. An air conditioning system including, in combination, a radiator for each room, means associated therewith to positively circulate the room air thereover, means to circulate a medium through the radiators, means to heat said medium when required, means to cool said medium when required, and means to supply a quantity of air of predetermined humidity to each room, said quantity being controlled separately for each room.

17. The method of providing cold water for room cooling comprising, dehydrating air, delivering said air to rooms which are separately and directly cooled by circulated cold water to thereby reduce the humidity therein, returning the air from the rooms at a wet bulb temperature lower than that of the outside atmosphere and intimately contacting said return air and return water to cool the water by evaporation for reuse.

ERNEST B. MILLER.